United States Patent
Skjellerup et al.

(10) Patent No.: US 7,196,742 B2
(45) Date of Patent: Mar. 27, 2007

(54) SHADE ASSEMBLY FOR DISPLAY SCREEN

(76) Inventors: Johan Skjellerup, P.O. Box 811269, Boca Raton, FL (US) 33481; Randall K. Skolnik, 20937 St. Andrews Blvd., Suite 21, Boca Raton, FL (US) 33433

( * ) Notice: Subject to any disclaimer, the term of this patent is extended or adjusted under 35 U.S.C. 154(b) by 786 days.

(21) Appl. No.: 10/266,282

(22) Filed: Oct. 7, 2002

(65) Prior Publication Data

US 2004/0075760 A1  Apr. 22, 2004

(51) Int. Cl.
*H04N 5/64* (2006.01)
*H04N 5/72* (2006.01)

(52) U.S. Cl. ..................... 348/834; 348/842

(58) Field of Classification Search ........... 348/834, 348/842
See application file for complete search history.

(56) References Cited

U.S. PATENT DOCUMENTS

| | | | |
|---|---|---|---|
| 3,329,770 A | 7/1967 | Rose | |
| 3,733,436 A | 5/1973 | Rose | |
| 4,081,809 A | 3/1978 | Kuboshima | |
| 4,444,465 A | 4/1984 | Giulie et al. | |
| 4,653,884 A | 3/1987 | Johnson et al. | |
| 4,863,242 A | 9/1989 | Correa | |
| 5,508,757 A | 4/1996 | Chen | |
| 5,717,566 A | 2/1998 | Tao | |
| 5,877,896 A | 3/1999 | Gremban | |
| 5,905,546 A * | 5/1999 | Giulie et al. | 348/842 |
| 5,997,145 A * | 12/1999 | Mora | 359/609 |
| 6,046,754 A * | 4/2000 | Stanek | 345/169 |
| 6,084,711 A | 7/2000 | Duff | |
| 6,144,419 A * | 11/2000 | Schmidt | 348/842 |
| 6,302,546 B1 * | 10/2001 | Kordiak | 359/608 |
| 6,356,439 B1 * | 3/2002 | Schmidt | 361/683 |
| 6,394,615 B1 * | 5/2002 | Hill et al. | 359/608 |
| 6,419,367 B1 * | 7/2002 | Dion et al. | 359/612 |
| 6,775,038 B2 * | 8/2004 | Edwards et al. | 359/601 |
| 6,839,227 B1 * | 1/2005 | Correa | 361/683 |

FOREIGN PATENT DOCUMENTS

| | | |
|---|---|---|
| DE | 907 373 C | 3/1954 |
| DE | 947 279 C | 8/1956 |
| EP | 1 408 368 B1 | 8/2005 |
| JP | 06 167584 A | 6/1994 |
| JP | 10 288955 A | 10/1998 |

* cited by examiner

*Primary Examiner*—Brian P. Yenke
(74) *Attorney, Agent, or Firm*—Malloy & Malloy, P.A.

(57) ABSTRACT

An assembly structured to facilitate the viewing of a display screen or like display structure of the type typically found on a digital camera. A base having an open interior is fixedly or removably secured in surrounding relation to the display screen and extends. outwardly therefrom. A closure assembly includes a plurality of shade sections selectively positionable between an operative position and a closed position. The operative position comprises the shade sections extending outwardly from the base in substantially coaxial relation thereto so as to at least partially define, along with the base, a viewing channel disposed within and extending through both the closure assembly and the base when the closure assembly is in the operative position.

29 Claims, 7 Drawing Sheets

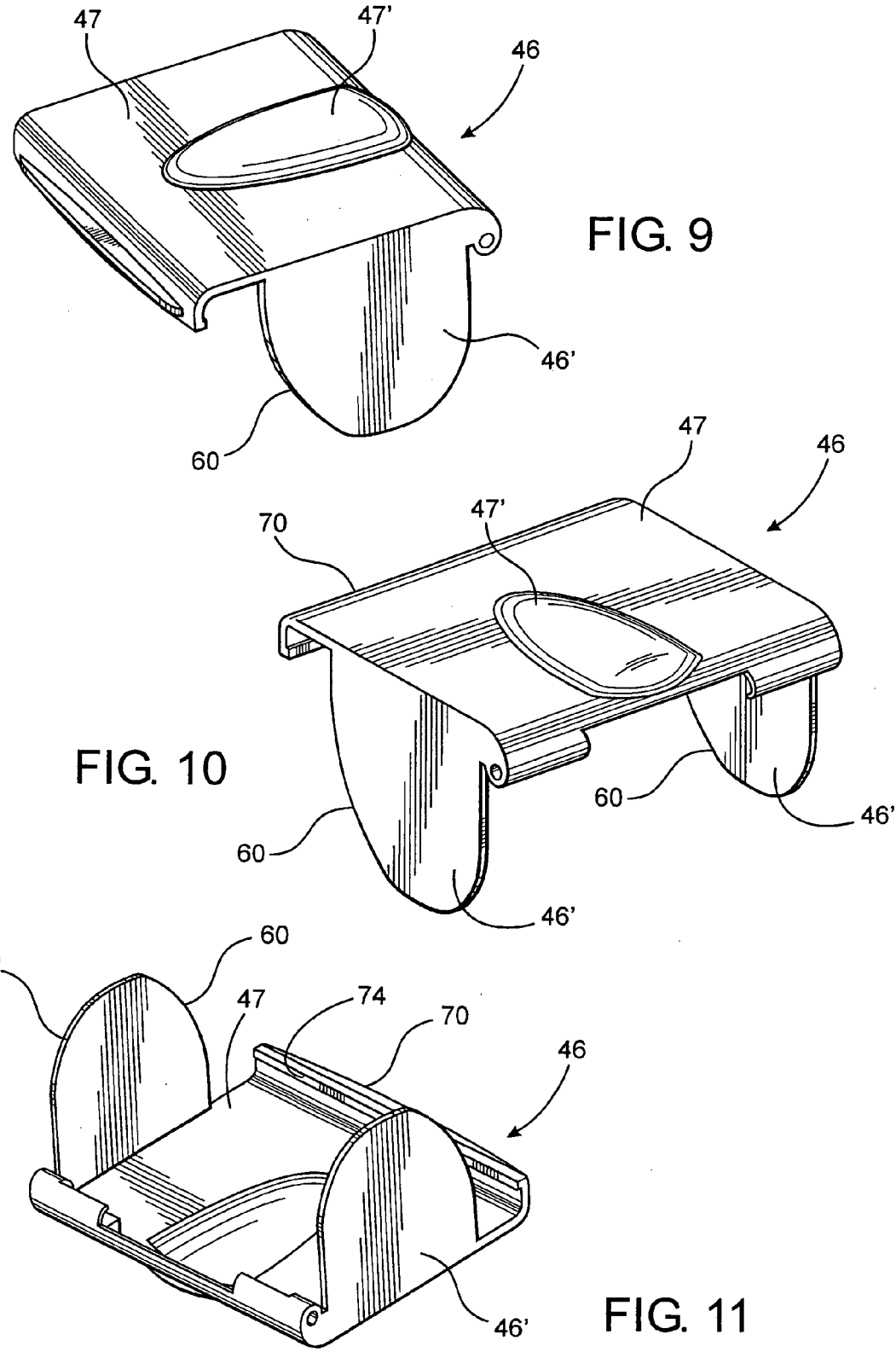

SHADE ASSEMBLY FOR DISPLAY SCREEN

BACKGROUND OF THE INVENTION

1. Field of the Invention

This invention is directed to an assembly structured to be mounted adjacent a display screen of a digital camera or like device and including a closure assembly selectively disposed in an operative position or a closed position. The operative position is defined by the closure assembly extending outwardly from a base and defining a viewing channel disposed on the interior of the closure assembly and base in surrounding relation thereto, such that exposure of the display screen to ambient light is restricted.

2. Description of the Related Art

The advancements in modern day technology has led to the commercial availability of numerous devices such as, but not limited to, computers, cameras, telephones, personal digital assistants, pagers, etc. All of these devices incorporate some type of visual display assembly. Typically and especially with handheld or portable devices such display assemblies comprise display screens more specifically structured as liquid crystal displays (LCD).

Because of the size and availability of such devices, their use is ubiquitous to the extent of being operative for a variety of intended uses in almost any location. Again with particular reference to mobile or portable devices, including laptop computers, cameras, telephones, etc., the attempted viewing of the display screen is sometimes inhibited by the presence of ambient light impinging on the display screen. The result is a "wash-out" effect wherein the color and/or the images presented on the display screen are obscured to the point of becoming difficult, if not impossible for the user to determine.

Attempts to overcome such viewing problems frequently involve the adjustment of the brightness or contrast capabilities of the display screen. However, the simplest way to avoid direct exposure of ambient light to the display screen is to reorient or reposition the camera, computer, etc. on which the display screen is located, such that direct exposure to the sunlight or other surrounding light conditions, is avoided. In many situations repositioning of the display screen is impractical, such as when taking a picture or viewing a scene with a digital camera. Similar problems arise with laptop computers, wherein a reorientation of the display screen thereof may involve a repositioning or resettling of the user as well as the computer.

Recognition of problems associated with obscuring the image of display screens, due to ambient light conditions, has reached the point where numerous attempts have been made to provide various types of shade structures. Typically, such shade structures are connected to or positioned about the display screen or assembly portion of the device in order to protect the display screen from being directly exposed to light. While existing or prior art attempts to develop shade structures are assumed to be at least minimally operative for their intended function, it has become apparent the structural and operational features of such shade devices render them less than popular with the consuming public as evidenced by the sparsity of their use. In addition known shade type structures also include certain disadvantages relating to the complexity of use or attachment, as well as the apparent necessity to manufacture such devices on somewhat of a "customized" basis. Therefore economical production techniques cannot be utilized in the manufacturing of a great number of known shade type structures since they are not universally adaptable to a variety of different devices.

One category of modern devices enjoying ever increasing popularity includes digital cameras. In operation, the user thereof is required to view the image intended to be captured by means of a display assembly typically in the form of the aforementioned LCD display screen. The size and versatility of the various models, makes, and categories of digital cameras have, up to the present time, made it difficult to develop and produce a preferred shade assembly which is specifically, but not exclusively, adaptable for use in the providing of shade to the display screen thereof. Also, while the broad or general concept of a shutter type of device may be known to protect a viewing lens portion of a camera, such devices are not readily adaptable for use in providing shade to a display screen of a digital camera by restricting incoming ambient light from a preferred viewing channel exposed in aligned relation with the display screen of a digital camera.

Therefore, there is a need in this industry for a shade assembly specifically, but not exclusively, structured for use with a digital camera. Such a preferred shade assembly could be universal in its structure and operation so as to increase the versatility thereof and allow it to be used with a variety of devices including different models, types, etc of digital cameras. Regardless of the specific application, an improved shade assembly of the typed described in greater detail hereinafter should be removably or fixedly secured to the camera adjacent to and in surrounding relation to the display screen.

Further, the structural features of such a preferred shade assembly should be such as to allow it to be easily and quickly oriented between a closed position and an open or operative position without undue manipulation thereof. As such, the various shading components of a preferred shade assembly should be operative to provide shade to a display assembly by a single manipulation of the finger or hand of the user. Finally, such a preferred and improved shade assembly should be long lasting, of light weight construction, and efficiently manufactured so as to be available to a wide range of consumers at a relatively low cost.

SUMMARY OF THE INVENTION

The present invention is directed to an assembly structured to facilitate the viewing of a display screen of like display portion of a digital camera. As will become apparent hereinafter, the shade assembly of the present invention is applicable for use with a variety of different devices other than a digital cameras. However, in each of a plurality of possible applications, the shade assembly of the present invention is either removably of fixedly secured immediately adjacent to and surrounding the display screen by extending substantially continuously about the periphery thereof. As will also be apparent, the various portions of the shade assembly are preferably formed form an opaque or other light restricting material which prevents or at least reduces the possibility of the display screen being directly exposed to sunlight or other ambient light sources.

More specifically, the shade assembly of the present invention comprises a base having an open interior communicating with two oppositely disposed open ends. The innermost open end of the base is secured immediately adjacent to the display screen of the digital camera or other device. The mounting of the base can be either fixed or permanent, such as when the base comprises an originally manufactured or supplied component of the digital camera. Alternatively, the base may be removably secured to the digital camera, in surrounding relation to the display assembly, preferably by means of a mounting assembly.

In at least one preferred embodiment, the mounting assembly comprises a mounting frame having an open interior surrounded by a continuous or closed peripheral portion. The dimension and configuration of the mounting frame substantially corresponds to the display screen such that it is adhesively secured, or otherwise attached, immediately adjacent to the periphery of the display screen and in surrounding relation to the viewing portion thereof. The innermost open end of the base is cooperatively structured with a connecting assembly associated with and extending outwardly from the peripheral portion of the mounting frame, such that the base may be removably mounted thereon and at least partially supported thereby. Accordingly, when properly positioned, the base is secured to the mounting frame and is oriented to extend outwardly from the mounting frame and the display screen in surrounding relation to the display screen.

Additional structural features of the shade assembly of the present invention include the provision of a closure assembly. The closure assembly is secured to the base adjacent or contiguous to the outer open end thereof. Further the closure assembly includes a plurality of shade sections, preferably including at least first and second shade sections. The shade sections are selectively movable, relative to the base and one another into and out of either a closed position or the open, operative position. Moreover, each of the shade sections comprise a plurality of walls or panels secured to one another and collectively movable relative to the base as they are disposed between the aforementioned closed and operative positions.

In addition, the plurality of wall or panel members of each of the shade sections are cooperatively disposed and structured to collectively surround and extend outwardly from the base in substantially coaxial relation thereto, when the closure assembly is in the operative position. Further, at least one of the shade sections includes a lid, cover, or like closure member disposable in overlying covering relation to the outermost open end of the base when the closure assembly is in the closed position. The closed position is also defined by the walls or panels of each shade section, other than the cover member, being disposed on the interior of the base in somewhat overlapping relation to one other.

Quick and efficient positioning of the cover assembly between open, closed and operative positions is facilitated by at least one of the shade sections being disposed and structured to drivingly engage the other of the shade sections by virtue of a camming engagement there between. As such, the plurality of shade sections are concurrently oriented in either the closed or operative position, as will be apparent hereinafter.

Therefore, the orientation of the closure assembly in the operative position, being substantially coaxial to the base, results in the provision of a "viewing channel". The viewing channel is visually aligned with the display screen. When being used an operator of the digital camera on which the shade assembly of the present invention is mounted views along the viewing channel. As set forth above, the material from which the base, as well as at least the majority of the closure assembly is formed is light restricting. Therefore, due to the surrounding relation of the base and the plurality of shade sections relative to the viewing channel light is restricted from passing into the interior of the viewing channel in a manner which would obscure the image appearing on the display screen. Naturally, while in its operative position, the closure assembly is structured to provide an access opening through which viewing of the display screen, along the aforementioned viewing channel, is easily accomplished.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 9 is a top perspective view of a portion of the closure assembly of the preferred embodiment of FIG. 2.

FIG. 10 is a rear perspective view of the embodiment of FIG. 9.

FIG. 11 is a bottom perspective view of the embodiment of FIGS. 9 and 10.

Like reference numerals refer to like parts throughout the several views of the drawings.

DETAILED DESCRIPTION OF THE PREFERRED EMBODIMENT

Figure 1:
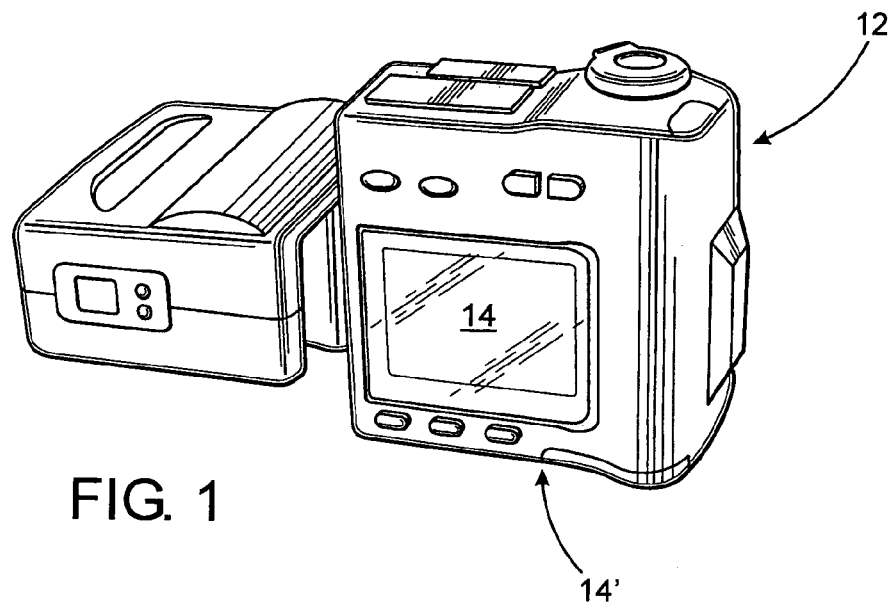
FIG. 1 is a perspective view of a digital camera of the type which the shade assembly of the present invention may be fixedly or removable mounted.

As shown in the accompanying drawings, the present invention is directed to a shade assembly generally indicated as 10 which is structured to be fixedly or removably secured to a digital camera or a variety of other devices of the type generally indicated as 12 in FIG. 1. More specifically, the shade assembly 10 is designed to he cooperatively positioned on the digital camera of like device 12 in direct association with a display screen 14, typically comprising a liquid crystal display (LCD) or other type of display structure. It is emphasized that the shade assembly 10 is structured for particular use in providing shade for the display screen 14 of a digital camera 12. However, the shade assembly 10 can be utilized, with little or no structural modification other than variations in dimension, to effectively shade various other types of display screens or like display structures associated with a wide range of different devices or appliances.

Figure 7:
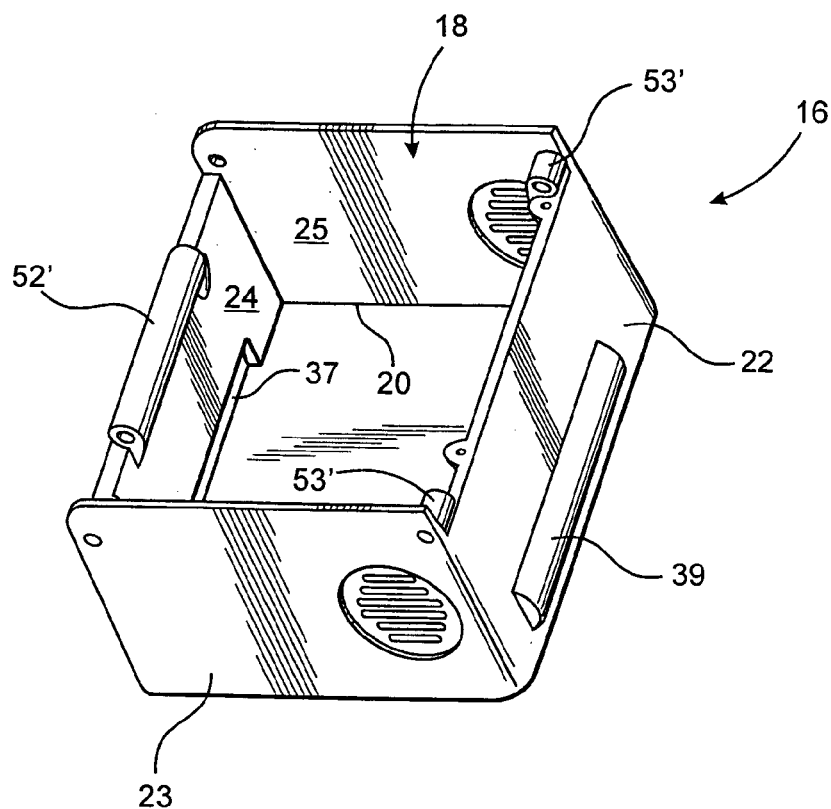
FIG. 7 is a top perspective view of the base portion of the embodiment of FIG. 2.
Figure 8:
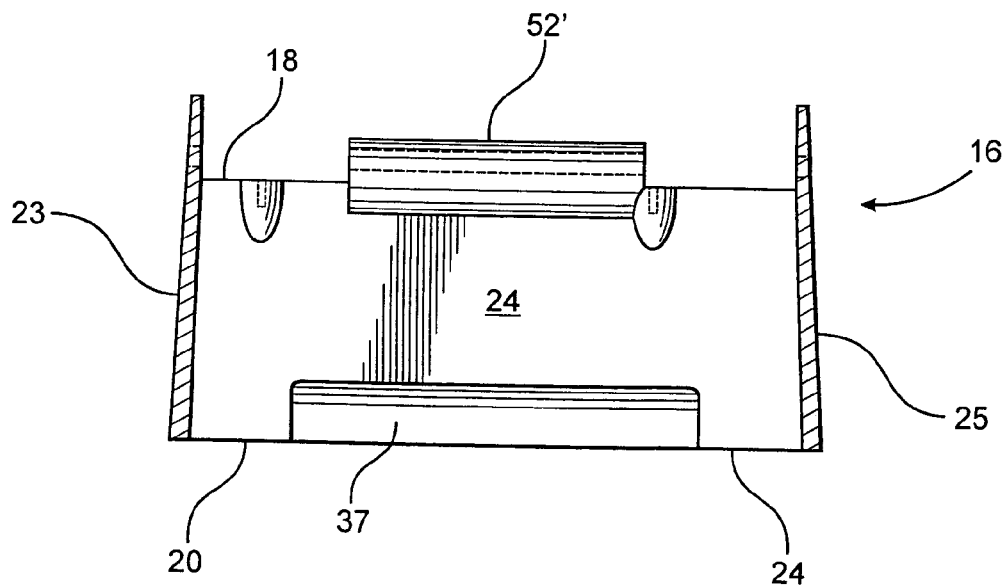
FIG. 8 is a sectional view of the embodiment of FIG. 7.
Figure 12:
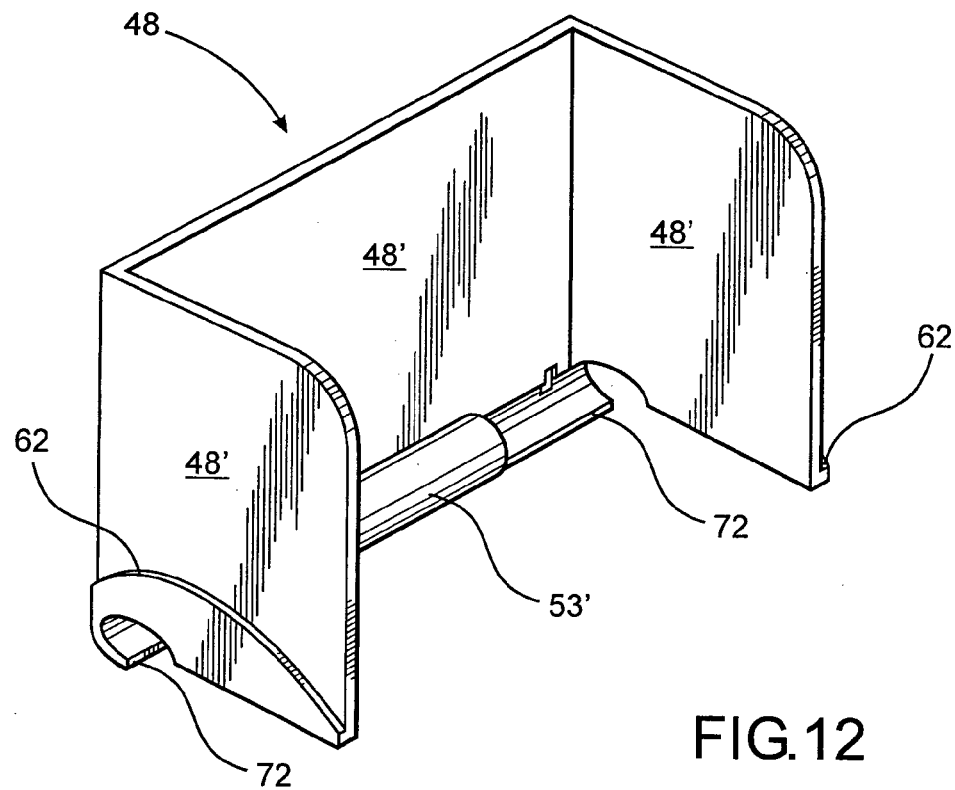
FIG. 12 is an interior perspective view of another component of the closure assembly of the embodiment of FIG. 2.
Figure 13:
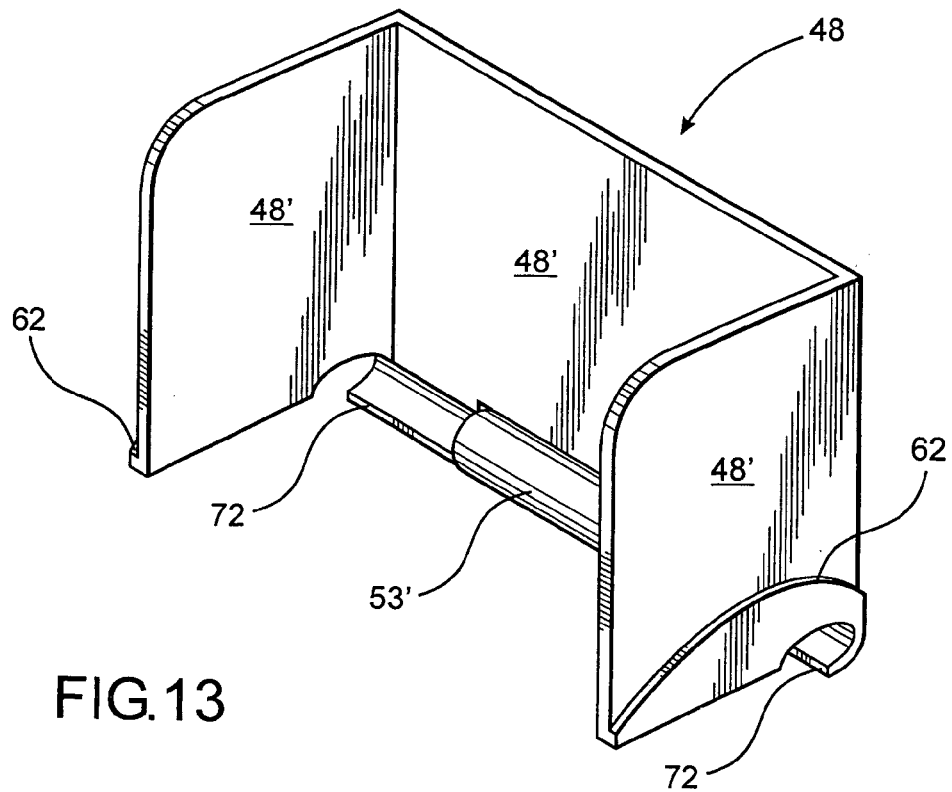
FIG. 13 is a perspective view from an opposing angle from that of FIG. 12 of the embodiment thereof.

Therefore, the shade assembly 10 comprises a base 16 shown in detail in FIGS. 7 and 8 having an open interior directly communicating with oppositely disposed open ends 18 and 20. For purposes of clarity, open end 18 may be referred to herein as the outer open end and the open end 20 may be referred to as the inner open end. Further, the base 16 comprises a plurality of interconnected panels 22, 23, 24, and 25 extending about the open interior of the base 16 and defining a continuous or closed peripheral portion of the base 16 as shown throughout the various figures. The panels or walls 22–25 are preferably formed from an opaque or other light restricting material which restricts the passage of light there through and therefore provides adequate shading to the display screen 14, as will be explained in greater detail hereinafter.

Figure 2:
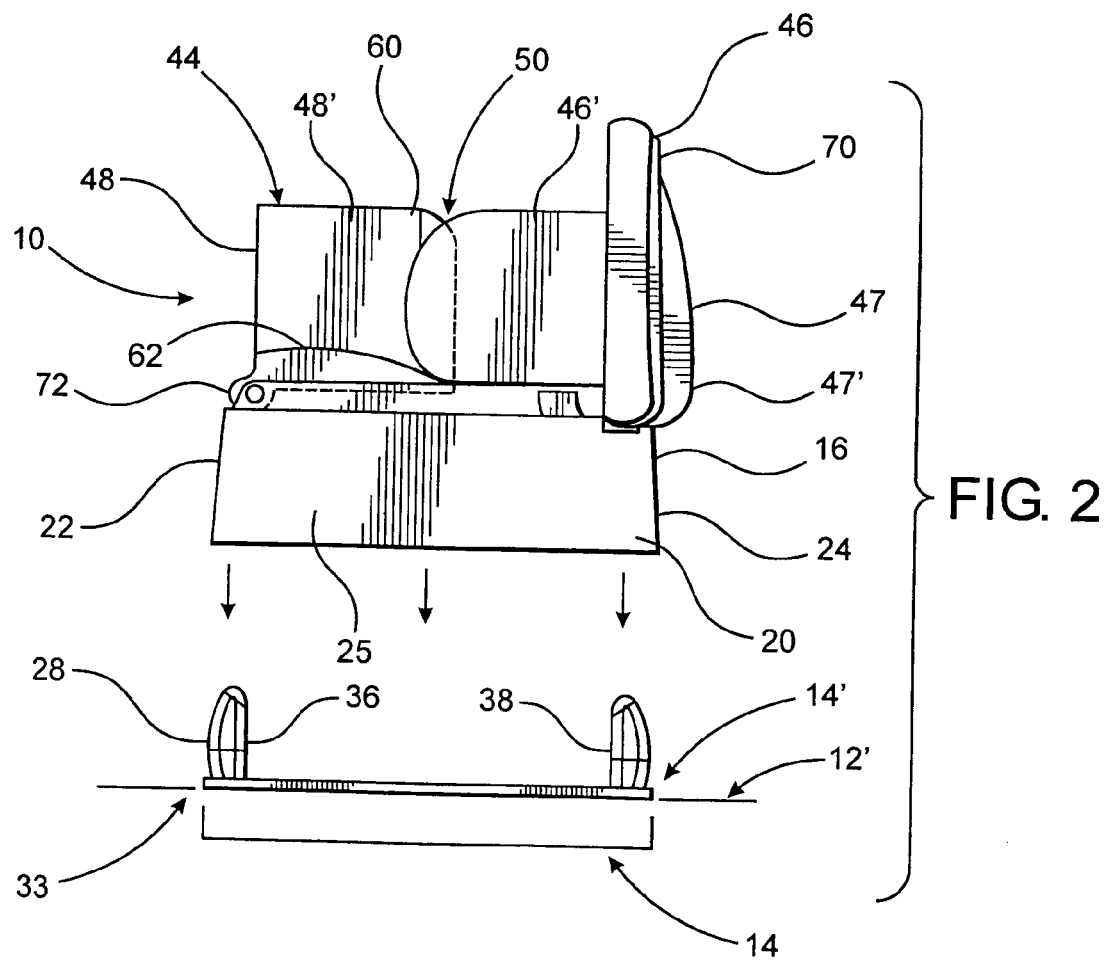
FIG. 2 is a side view in exploded form of a base and closure assembly as it is being positioned on a digital camera in an operative position relative to the display screen.
Figure 3:
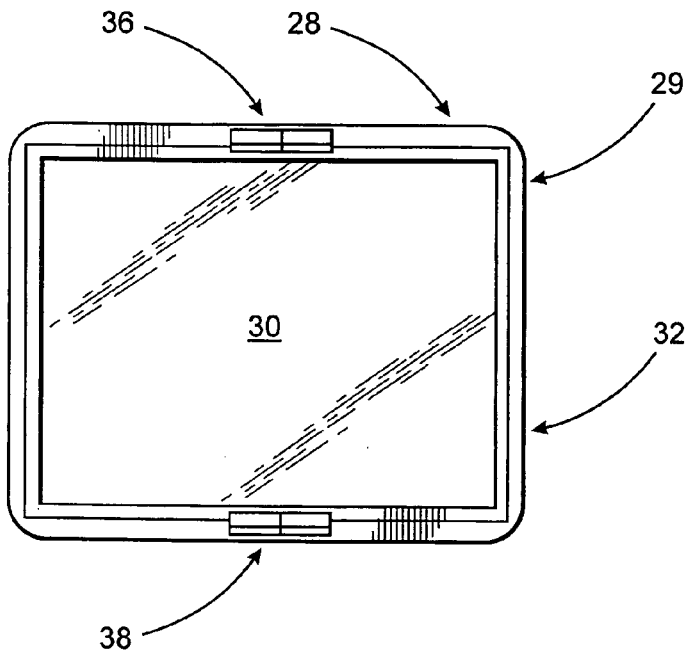
FIG. 3 is a front plan view of the mounting assembly associated with the embodiment of FIG. 2.

As disclosed in FIG. 2, the base 16 is either fixedly or removably secured to the digital camera 12 or like device immediately adjacent to and surrounding the display screen 14. For purposes of clarity the display screen is represented in phantom lines, and may be at least partially recessed into the interior of the device 12 but clearly viewable on the exposed face 12' thereof. In a preferred embodiment of the present invention, the base 16 is removably secured in surrounding relation to the display screen 14 by means of a mounting assembly generally indicated as 28. The mounting assembly 28 is preferably in the form of a mounting frame 29 having an open interior 30 surrounded by a substantially closed, continuously formed peripheral portion 32. The mounting frame 29 is dimensioned and configured to correspond to the display screen 14 such that the peripheral portion 32 is either fixedly or removably secured about a periphery 14' thereof. It is emphasized that the mounting frame 29 is not limited to a rectangular, square, or other multi-sided configuration but may vary in dimension and configuration so as to corresponded to the periphery 14' as well as the display screen 14.

Securement of the display screen 29 about the periphery 14' of the display screen 14 may preferably be accomplished by an adhesive or like material 33 secured to an undersurface of the peripheral portion 32 and structured to either fixedly or removably secure the mounting frame 29 to the periphery 14', as set forth above. The present invention contemplates a variety of other means of securing the mounting frame 29 to the digital camera or like device 12 to accomplish its fixed, permanent or removable mounting on the exposed face 12'. It is further contemplated that the mounting frame 29 can be integrally or otherwise permanently secured to the device 12, such as when the mounting frame 29 or other structural modification defining the mounting assembly 28 is originally manufactured or assembled with the digital camera 12.

The removable mounting of the base 16 about the periphery 14' of the display screen 14 is preferably accomplished by a connecting assembly comprising at least one, but preferably a plurality of mounting bars 36 and 38. In the embodiment of FIG. 2 the mounting bars 36 and 38 may comprise outwardly projecting finger-like projections disposed in spaced, substantially opposing relation to one another. Further, the mounting bars or fingers 36 and 38 are dimensioned and configured to frictionally and removably engage interior surface portions of the base 16 as the base is disposed in telescoping relation to the mounting bars 36 and 38, as indicated by the directional arrows of FIG. 2.

Figure 6:
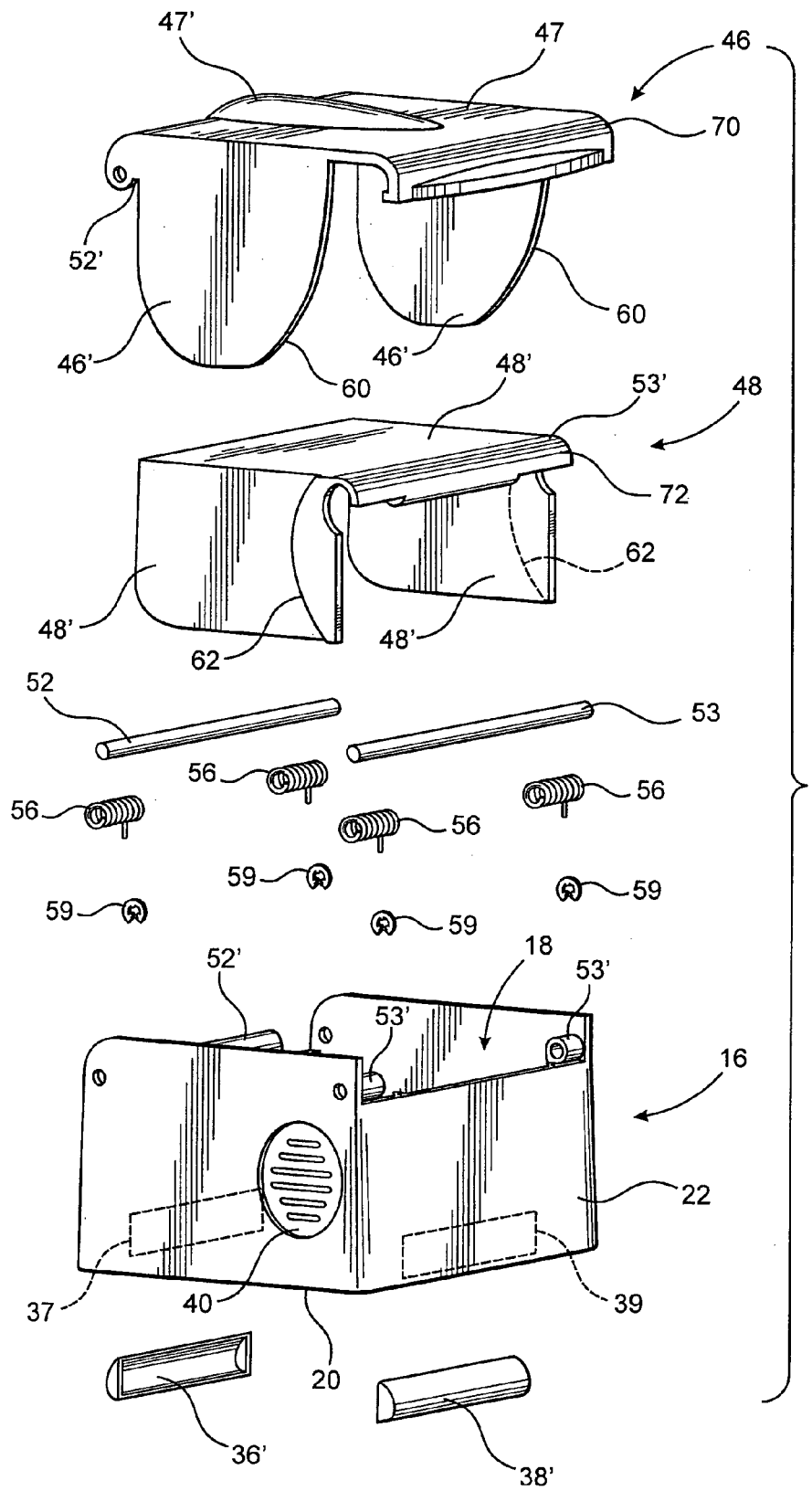
FIG. 6 is a perspective view in exploded, unassembled form including the various components comprising the base and closure assembly of a preferred embodiment of the shade assembly of the present invention.

With further reference to FIG. 6, the mounting assembly 26 may comprise an alternate structure indicated as mounting bars 36' and 38'. Mounting bars 36' and 38' each include an elongated configuration, wherein the respective lengths thereof are such as to slidingly and frictionally engage corresponding interior surfaces of the base walls or panels 22 or 24. In order to accommodate mounting bars 36, 38 or 36', 38' the interior surfaces of the base 16 include, in at least one embodiment, correspondingly configured and dimensioned recesses 37 and 39 on appropriately positioned ones of the walls, such as at 22 and 24. In addition, the recesses 37 and 39 are specifically dimensioned and configured to maintain the aforementioned frictional engagement between the mounting bars and the base 16. Further, regardless of the embodiment of the mounting bars 36, 38 or 36', 38' it is emphasized that they may be secured to the frame 29 or alternatively may be secured directly to the digital camera 12 or other device with which the shade assembly 10 may be used.

As should be apparent the base 16 is thereby removably secured in surrounding relation to the display screen 14 when it is desirable to exclude or restrict the exposure of the face of the display screen 14 to sunlight or other light sources. As disclosed in FIGS. 4–8, outer surfaces of oppositely disposed walls or panels, such as at 23 and 25, may include raised and/or outwardly protruding finger engaging pads as at 40 and 42. These pads 40 and 42 will serve to facilitate directional positioning of the base 16 as well as facilitate the gripping thereof by the fingers of a user as the base is mounted on or removed from the mounting assembly 28 relative to the display screen.

Another structural feature of an at least one preferred embodiment of the present invention comprises the provision of a closure assembly generally indicated as 44. The closure assembly 44 is shown in its operative position in the preferred embodiment of FIG. 2 and in greater detail both in an operative position and a closed position in FIGS. 4–5. As such, the closure assembly 44 comprises a plurality of shade, sections preferably two in number, where in a first shade section 46 and a second shade section 48 are movably mounted to the base 16 adjacent or contiguous to the open outer end 18. As will be explained in greater detail hereinafter, the first and second shade sections 46 and 48 are pivotally connected by means of pivot rods or shafts 52 and 53 secured within corresponding mounts 52' and 53' connected to or integral with the respective shade sections and corresponding sides of the base 16 about the periphery of the open end 18. With primary reference to FIG. 6, each of the first and second shade sections 46 and 48 comprise a plurality of wall or panel segments 46' and 48' respectively. In addition, at least one of the shade sections, such as the first shade section 46 includes a cover, lid or closure member 47. As explained in greater detail hereinafter the lid or closure member also serves as one of the wall or panel segments providing shade to the display screen 14, when in the operative position of FIGS. 2 and 4.

Figure 4:
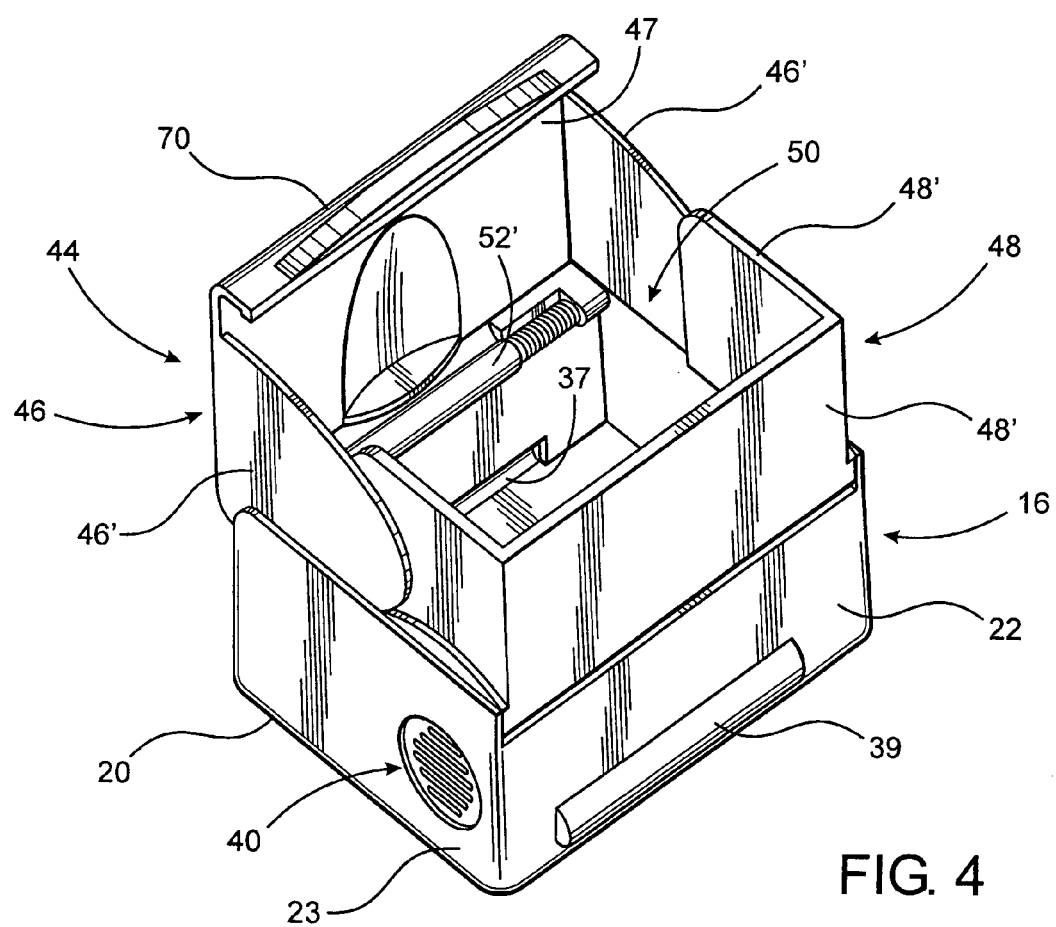
FIG. 4 is a top interior perspective view of the base and enclosure assembly in an operative position, as represented in the embodiment of FIG. 2.

More specifically, each of the aforementioned wall or panel segments of the respective shade sections 46 and 48 are interconnected to one another, such that when in the operative position of FIGS. 2 and 4, they are collectively disposed in substantially coaxial relation to the base 16. In such a cooperative, coaxial orientation, both the closure assembly 44 and the base 16 are disposed to at least partially define a viewing channel on the interior thereof. The aforementioned viewing channel is disposed in visual alignment with the display screen 14 and extends at least from an access opening 50, longitudinally through the shading sections 46 and 48 and the base 16, to the lower open end 20 of base 16. For purposes of clarity, the access opening is defined by the upper or outer peripheral portion of the first and second shading sections 46 and 48, when in the operative position of FIGS. 2 and 4.

Figure 5:
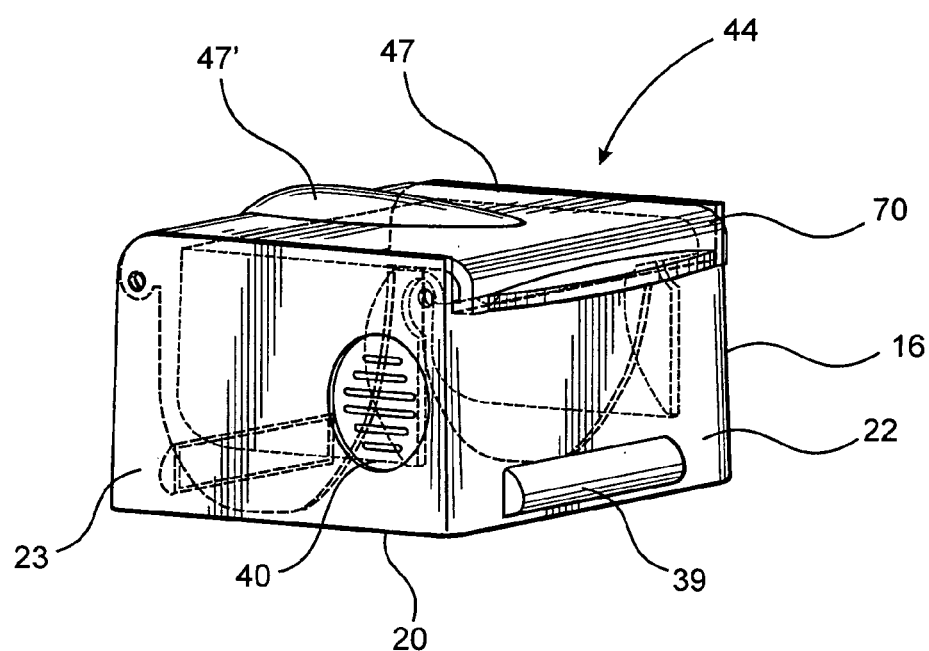
FIG. 5 is a perspective view of the embodiment of FIG. 2 in a closed position.

The aforementioned closed position of the closure assembly 44 is depicted in FIG. 5 and comprises corresponding ones of the plurality of panels or wall segments 46' and 48' of the respective shade sections 46 and 48 being disposed in substantially side by side overlapping relation to one another and in substantially parallel relation to the spaced apart walls 23 and 25 of the base 16. The closed position further comprises the cover number 47 disposed in overlying, covering relation to the intermediate shade section 48' as well as the open outer end 18 of the base. The cover member 47 also overlies or covers the panel or wall segments 46' and 48' which are disposed within the interior of the base 16.

With primary referenced to FIG. 6, each of the plurality of shade sections 46 and 48 are movably, and preferably pivotally, connected to the base 16 adjacent the outer open end 18. As set forth above, the pivotal connections comprise pivot rods or shafts 52 and 53 secured within corresponding mounts 52' and 53' connected to or mounted on respective shade sections 46 and 48 as well as base 16. As such, the shade sections 46 and 48 pivot about the shafts or rods 52 and 53 respectively into and out of the aforementioned closed and operative positions. Also, each of the pivotal connections include one or more biasing springs 56 appropriately interconnected to the pivot shafts 52 and 53, such that both of the shade sections 46 and 48 are normally biased into the operative position of FIGS. 2 and 4. Retaining members 59 may be appropriately positioned to further facilitate the mounting of the respective pivot rods 52 and 53 as well as the biasing springs 56 relative to the casings 52' and 53'.

While the shade sections 46 and 48 are normally biased into the operative position through the position of the biasing springs 56, a minimal pushing or lifting force will serve to dispose the shade sections 46 and 48, respectively, into either the closed position or operative position as should be apparent. Moreover, cooperative structuring of the shade sections 46 and 48 allows their concurrent movement as they travel both into and out of either the operative or closed positions. Such concurrent movement is facilitated by virtue of at least one of the shade sections, such as first shade section 46, disposed in driving engagement with the other or second shade section 48. Such driving engagement is accomplished by at least one but preferably two cam members at least partially defined by the peripheral edge 60 mounted on and movable with each of the panel or wall segments 46'. Similarly, the shade section 48 includes 2 cam followers or driven portions 62 each disposed on the exterior of the opposing, end most wall or panel segments 48' of the second shade section 48.

With reference to FIGS. 2 and 4, the cam members 60 movably engage the cam followers 62 such that downward or inward pivotal movement of the first shade section 46 forces the peripheral edge of the cam members 60 to drivingly engage and force the cam followers or peripheral portions 62 downwardly or inwardly. Similarly, travel of the first shade section 46, upwardly or outwardly, back into the operative position from the closed position allows an effective "release" of the second shade section 48 as the peripheral edges or cam members 60 travel along the length of the cam followers 62. By virtue of this cooperative structuring and the concurrent movement of the shade sections 46 and 48 into the operative position of FIGS. 2 and 4, the shade assembly 10 is quickly and easily oriented to provide proper shading of the display screen 14, such as when the digital camera 12 is operative. Alternatively, the display screen 14 can be effectively protected, enclosed and covered as the first shade section 46 is pivoted inwardly into driving engagement with the second shade section 48, such that shade assembly 10 assumes the closed position of FIG. 5, as set forth above.

Additional structural features of the shade assembly 10 of the present invention include a depending lip 70 formed on the outer peripheral edge of the cover 47 and extending along at least a portion of the length thereof. The depending lip 70 is disposed and structured to at least partially define a latch member which is disposed in overlying, frictional engagement within opposite or innermost peripheral edge 72 of the shade section 48, when the shade sections 46 and 48 are in the closed position. More specifically, the inner surface as at 74 may be roughened, ribbed or otherwise configured to facilitate frictional engagement with the exterior surface of the inner peripheral edge or portion 72 of the shade section 48. By virtue of this cooperative structuring, the depending lip or latch portion 70 serves to frictionally and removably maintain the shade sections 46 and 48 in the closed position of FIG. 5. Disposition of the shade sections 46 and 48 into the open position of FIGS. 2 and 4 is easily accomplished by exerting a lifting force on an appropriate portion of the depending lip or flange 70 so as to displace the frictional engagement between the interior surface 74 and the exterior surface of the inner peripheral edge or portion 72. In addition, the outer surface of the cover member 47 includes an outwardly extending projection 47' which may also serve to at least partially engage and/or grip the cover member 47 for positioning thereof into either the open position or the closed position as at forth above.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A shade assembly structured to facilitate viewing of a display screen, said shade assembly comprising:
   a) a base disposed in surrounding relation to the display screen and extending outwardly therefrom,
   b) said base comprising a hollow interior terminating in oppositely disposed open ends,
   c) a closure assembly movably connected to said base and disposable between a closed position and an operative position relative to an outermost one of said open ends,
   d) said closure assembly comprising a plurality of at least a first shade section and a second shade section movably connected to said base and concurrently disposable between said closed and operative positions, said first and second shade sections normally biased into said operative position,
   e) at least one of said plurality of shade sections being disposed in driving engagement with one other of said plurality shade sections as said shade sections move between said operative position and closed position, and
   f) a viewing channel disposed in visually aligned relation with the display screen and at least partially defined by said plurality of shade sections collectively extending outwardly from said base about a periphery of said viewing channel.

2. A shade assembly as recited in claim 1 wherein said viewing channel is further defined by said hollow interior of said base.

3. A shade assembly as recited in claim 2 wherein said plurality of shade sections are disposed in co-axial relation to said base when in said operative position.

4. A shade assembly as recited in claim 3 wherein said base and said plurality of shade sections are formed of a light restricting material.

5. A shade assembly as recited in claim 1 wherein said one shade member comprises a cam assembly secured thereto and disposed in driving engagement with said one other shade section.

6. A shade assembly as recited in claim 5 wherein said cam assembly comprises at least one cam member disposed in driving engagement with said one other shade section.

7. A shade assembly as recited in claim 5 wherein said cam assembly comprises a plurality of cam members secured to said one shade section and disposed in driving engagement with correspondingly disposed portions of said one other shade section.

8. A shade assembly as recited in claim 1 wherein said first and second shade sections are each disposed in at least partially surrounding relation to said viewing channel when in said operative position.

9. A shade assembly as recited in claim 8 wherein each of said first and second shade sections comprises a plurality of wall members, said operative position comprising said plurality of wall members of both said first and second shade section collectively extending about and at least partially defining a periphery of said viewing channel.

10. A shade assembly as recited in claim 9 further comprising a closure member defined by at least one of said wall members of at least one of said first or second shade sections.

11. A shade assembly as recited in claim 10 wherein said closed position comprises said closure member disposed in overlying, covering relation to an outermost one of said open ends of said base.

12. A shade assembly structured to facilitate viewing of a display screen, said shade assembly comprising:
    a) a base disposed in surrounding relation to the display screen and extending outwardly therefrom,
    b) a closure assembly movably connected to an outer end of said base and structured for orientation in either an operative position or a closed position,
    c) said closure assembly including at least a first shade section and a second shade section concurrently movable between said operative position and said closed position,
    d) said closed position comprising said first and second shade sections extending through and outer open end of said base into an interior thereof and including correspondingly disposed wall numbers of said first and second shade sections disposed in overlapping relation to one another on an interior of said base,
    e) a viewing channel extending through said base and said closure assembly when said first and second shade sections are in said operative positions, and
    f) said viewing channel visually aligned with said display screen.

13. A shade assembly as recited in claim 12 wherein said base and said closure assembly are substantially co-axially aligned when said first and second shade sections are in said operative position.

14. A shade assembly as recited in claim 13 wherein said base comprises a laterally closed configuration disposed in surrounding relation to said viewing channel.

15. A shade assembly as recited in claim 14 wherein said first and second shade sections are collectively disposed outwardly from said base in surrounding relation to said viewing channel.

16. A shade assembly as recited in claim 12 wherein said closure assembly further comprises a closure member; said closure member disposed in covering relation to an outer end of said base when said closure assembly is in said closed position.

17. A shade assembly as recited in claim 12 wherein said base is fixedly secured in surrounding relation to said display screen.

18. A shade assembly as recited in claim 12 wherein said base is removably secured in surrounding relation to the display screen.

19. A shade assembly as recited in claim 18 further comprising a mounting assembly secured about a periphery of the display screen and structured to interconnect said base in adjacent surrounding relation to the display screen.

20. A shade assembly as recited in claim 19 wherein said base is removably connected to said mounting assembly.

21. A shade assembly as recited in claim 12 further comprising a mounting frame interconnecting said base in adjacent, surrounding relation to the display screen.

22. A shade assembly as recited in claim 21 wherein said mounting frame comprises an open interior at least partially surrounded by a peripheral portion, said peripheral portion connected to an innermost open end of said base.

23. A shade assembly as recited in claim 22 further comprising a connector assembly extending outwardly from said mounting frame in removable, supporting engagement with said base.

24. A shade assembly as recited in claim 23 wherein said connector assembly comprises a plurality of connecting members each secured to said peripheral portion and disposed into engaging relation with said base.

25. A shade assembly as recited in claim 24 wherein said plurality of connector members comprise at least two fingers disposed in spaced, substantially opposing relation to one another and being frictionally connected to corresponding interior portions of said base.

26. A shade assembly structured to facilitate viewing of a display screen on a digital camera said shade assembly comprising:
    a) a base disposed in surrounding relation to the display screen and extending outwardly therefrom, a mounting frame interconnected to an inner, open end of said base in adjacent, surrounding relation to the display screen, said base being removably secured to said mounting frame,
    b) a closure assembly movably connected to an outer end of said base and structured for orientation in either an operative position or a closed position,
    c) said closure assembly including at least a first shade section and a second shade section concurrently movable between said operative position and said closed position,
    d) at least one of said first and second shade sections being disposable in driving engagement with the other said shade sections when said first and second shade sections are concurrently disposed from said operative position into said closed position, e) said operative position comprising said first and second shade sections extending outwardly from said base in substantially co-axially relation thereto, f) said closed position comprising said first and second shade sections extending through an outer end of said base into overlapping relation with one another on an interior of said base, g) a cam assembly secured to one of said first and second shade sections in disposed and driving engagement with the other of said first and second shade sections at least when said first and second shade sections move from said operative position to closed position, and h) a viewing channel visually aligned with the display screen and disposed within and extending through said closure assembly and said base when said closure assembly is in said operative position.

27. A shade assembly as recited in claim 26 wherein said closure assembly further comprises a closure member connected to one of said first or second shade sections and disposed in overlying, covering relation to said open ends and said interior of said base.

28. A shade assembly as recited in claim 26 wherein said cam assembly comprises at least one cam member disposed in driving engagement with a correspondingly disposed portion of said other first or second shade section.

29. A shade assembly as recited in claim 28 wherein said cam assembly comprises a plurality of cam members secured to said one shade section and disposed in driving engagement with correspondingly disposed portions of said one other shade section.

* * * * *